US010539964B2

(12) United States Patent
Minorics

(10) Patent No.: US 10,539,964 B2
(45) Date of Patent: *Jan. 21, 2020

(54) AUTONOMOUS VEHICLE DUAL TRAFFIC REFLECTOR DETECTOR WITH WIRELESS TRANSMISSIONS

(71) Applicant: EASTON SCIENTIFIC, INC., Easton, PA (US)

(72) Inventor: Richard T. Minorics, Easton, PA (US)

(73) Assignee: EASTON SCIENTIFIC, INC., Easton, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/998,016

(22) Filed: Jun. 13, 2018

(65) Prior Publication Data

US 2019/0171221 A1    Jun. 6, 2019

Related U.S. Application Data

(63) Continuation-in-part of application No. 15/732,615, filed on Dec. 4, 2017, now Pat. No. 10,155,475.

(51) Int. Cl.
    *G05D 1/02*    (2006.01)
    *G08G 1/16*    (2006.01)
    (Continued)

(52) U.S. Cl.
    CPC ............. *G05D 1/0234* (2013.01); *B60Q 1/28* (2013.01); *G01S 17/48* (2013.01); *G01S 19/13* (2013.01);
    (Continued)

(58) Field of Classification Search
    CPC . B60Q 1/506; B60Q 3/66; B60Q 3/62; B60Q 1/28; G08G 1/096725;
    (Continued)

(56) References Cited

U.S. PATENT DOCUMENTS 2,426,163 A * 8/1947 Booth ..................... G09F 13/16
    359/527
3,431,554 A * 3/1969 Barbie ............. G08G 1/096716
    340/940

(Continued)

OTHER PUBLICATIONS

Aléxey Voronov, Radar Reflecting Pavement Markers for Vehicle Automation, Conference Item, 2016, 8 Pages,Rise Viktoria, Goteborg Sweden.

*Primary Examiner* — Orlando Bousono
*Assistant Examiner* — Son M Tang

(57) ABSTRACT

An autonomous vehicle dual traffic reflector device for detecting a second vehicle by a first vehicle includes an outer array having a plurality of colored light receiving-light transmitting lens, positioned in an arcuate arrangement having at least one focal point and the outer array having at least two caution-colored lenses; and an inner array positioned inside the outer array and between it and a focal point of the at least one focal point of side outer array, the inner array positioned to receive light passing into the device through at least one lens and reflecting the light out of the device through at least one different lens. Information and communication symbols are included on one or more lenses and may be reflected to a receiving vehicle to add site-specific information. A connected wireless communication component has one or more of: (i) a receiver for receiving information from a central control base via satellite; (ii) a transmitter for transmitting information to a central control base via satellite; (iii) a receiver for receiving information from an autonomous vehicle via wireless transmission; (iv) a transmitter for transmitting information to an autonomous vehicle via wireless transmission. A vehicles guidance system is included.

20 Claims, 14 Drawing Sheets

(51) Int. Cl.
*B60Q 1/28* (2006.01)
*G01S 17/48* (2006.01)
*G01S 19/13* (2010.01)

(52) U.S. Cl.
CPC ......... *G05D 1/0214* (2013.01); *G05D 1/0278* (2013.01); *G08G 1/164* (2013.01); *G08G 1/166* (2013.01); *G05D 2201/0213* (2013.01)

(58) Field of Classification Search
CPC .. G08G 1/096783; G08G 1/164; G08G 1/166; G02B 5/10; G02B 5/136; G02B 5/0289; G02B 5/045; G02B 5/0816; G05D 1/0234; G05D 1/0214; G05D 1/0278; G05D 2201/0213; G01S 17/48; G01S 19/13
USPC .......................................................... 701/301
See application file for complete search history.

(56) References Cited

U.S. PATENT DOCUMENTS

| | | | | |
|---|---|---|---|---|
| 3,814,500 | A * | 6/1974 | Ebenbichler | A01M 29/08 359/514 |
| 4,653,955 | A * | 3/1987 | Racs | E01F 9/553 116/63 R |
| 5,002,424 | A * | 3/1991 | Hedgewick | E01F 9/553 359/531 |
| 5,071,225 | A * | 12/1991 | Inoue | G02B 27/1006 359/589 |
| 5,277,516 | A * | 1/1994 | Strieter | A01M 29/08 404/14 |
| 5,449,244 | A * | 9/1995 | Sandino | E01F 9/553 404/14 |
| 5,726,648 | A * | 3/1998 | Soon | G08G 1/096 340/907 |
| 5,842,765 | A * | 12/1998 | Cassarly | G02B 6/0006 362/21 |
| 6,147,806 | A * | 11/2000 | Park | G02B 27/1006 359/247 |
| 6,267,530 | B1 * | 7/2001 | Attar | E01F 9/553 404/14 |
| 6,334,734 | B1 * | 1/2002 | Attar | E01F 9/573 404/12 |
| 6,461,022 | B1 * | 10/2002 | Kreutzer | B60Q 1/2611 362/293 |
| D519,050 | S * | 4/2006 | Lee | D10/113.1 |
| 8,169,311 | B1 | 5/2012 | Breed | |
| 9,014,953 | B2 | 4/2015 | Breed et al. | |
| 9,258,058 | B2 | 2/2016 | Oshima et al. | |
| 9,335,766 | B1 | 5/2016 | Silver et al. | |
| 9,652,985 | B2 | 5/2017 | Myer | |
| 2008/0030978 | A1 * | 2/2008 | Hume | E01F 9/559 362/145 |
| 2013/0214121 | A1 * | 8/2013 | Lee | G02B 27/40 250/201.4 |
| 2015/0070164 | A1 * | 3/2015 | Schalk | A01M 29/18 340/539.1 |
| 2016/0011362 | A1 * | 1/2016 | Jeng | G02B 6/006 362/606 |
| 2016/0132705 | A1 | 5/2016 | Kovarik et al. | |
| 2018/0058021 | A1 * | 3/2018 | Lee | E01F 9/559 |

* cited by examiner (Four Way Intersection)

AUTONOMOUS VEHICLE DUAL TRAFFIC REFLECTOR DETECTOR WITH WIRELESS TRANSMISSIONS

REFERENCE TO RELATED APPLICATIONS

The present application is a continuation-in-part of co-pending U.S. patent application Ser. No. 15/732,615, filed on 4 Dec. 2017, titled "AUTONOMOUS VEHICLE DUAL TRAFFIC REFLECTOR DETECTOR", by the same inventor herein.

BACKGROUND OF INVENTION a. Field of Invention

The present invention generally relates to reflector devices and systems involving these reflector devices. The present invention reflector devices have many applications, including ground guidance of airplanes, navigation guidance for waterways, roadway guidance and passive signaling and other advanced reflector applications. However, there is dire need for enhanced, accurate guidance systems with autonomous vehicles for lane maintenance and collision avoidance. On a macroscopic level, autonomous vehicle guidance relies upon satellite-based GPS systems that include trilateration and elevational readings. The accuracy, however, of the satellite-based GPS systems includes margins of error which sometimes result in autonomous vehicle collisions. Thus, the present invention is directed to, among other things, an accurate, ancillary guidance system that is locally positioned and locally accurate. Thus, the present invention autonomous vehicle dual traffic reflector detector has a plurality of lenses in an outer array and a plurality of reflective surfaces in an inner array so that light from a first vehicle will pass into the present invention reflector device, bounce off one or more reflectors and send a recognizable beam of light back to a second vehicle (oncoming). This second vehicle will receive the light, such as a cautionary colored light, and with its onboard computer will determine angle and location and will make lane travel adjustments, as needed. The present invention not only includes the reflector device, but also includes systems using reflector devices in conjunction with autonomous vehicle traffic flow. In some cases, the present invention reflector detector device may be advantageous to warn drivers of unseen oncoming traffic and enable the drivers to make adjustments—slow down, stop, pull over, change lanes, etc. Also, in these present invention devices and systems, there is a wireless communication component with a power source, the component being located at and connected to the device, and selected from the group consisting of: (i) a receiver for receiving information from a central control base via satellite; (ii) a transmitter for transmitting information to a central control base via satellite; (iii) a receiver for receiving information from an autonomous vehicle via wireless transmission; (iv) a transmitter for transmitting information to an autonomous vehicle via wireless transmission; and (v) any combination thereof. Preferably, most or all of these wireless communication components are included.

b. Description of Related Art

The following patents are representative of the field pertaining to the present invention:

United States Patent No. 2016/0132705 A1 to Kovarik et al describes a method and system for facilitating cost effective, reliable, system redundant, self-driving vehicles that involves the employment of specialized lane marking components that permit unprecedented sensor feedback, and in particular, a system and method that enables accurate lane marking recognition despite adverse weather conditions, which presently pose problems experienced by self-driving systems that rely upon vision based camera systems.

U.S. Pat. No. 8,169,311 B1 to Breed describes a vehicle with wireless sensors including a frame, at least one sensor assembly fixed to the frame and each including a sensor arranged to obtain data about a condition or property of the vehicle or part thereof or an environment in or around the vehicle, and a wireless transmission component coupled to the sensor for wirelessly transmitting a signal derived from the data obtained by the sensor, a receiver fixed to the frame arranged to receive signals from the wireless transmission component, and a reactive component for performing an action based on the data obtained by the sensor and transmitted from the wireless transmission component to the receiver. The data can be displayed as an indication to the driver or other occupant of the vehicle, relayed the data to a remote location for analysis or response and/or used to determine adjustment or control a component in the vehicle.

U.S. Pat. No. 9,014,953 B2 to Breed et al describes a Wireless sensing and communication system including sensors located on the vehicle, in the roadway or in the vicinity of the vehicle or roadway and which provide information which is transmitted to one or more interrogators in the vehicle by a wireless radio frequency mechanism. Power to operate a particular sensor is supplied by the interrogator or the sensor is independently connected to either a battery, generator, vehicle power source or some source of power external to the vehicle. The sensors can provide information about the vehicle and its interior or exterior environment, about individual components, systems, vehicle occupants, subsystems, or about the roadway, ambient atmosphere, travel conditions and external objects. The sensors arranged on the roadway or ancillary structures would include pressure sensors, temperature sensors, moisture content or humidity sensors, and friction sensors.

U.S. Pat. No. 9,258,058 B2 to Oshima et al describes a signal transmitting apparatus that includes a light emitter and a circuit that controls the light emitter change in luminance in frequency to transmit a signal to a receiving apparatus. The receiving apparatus includes a processor and a recording medium having a program, the program causing the processor to execute operations. The operations include obtaining first image data with a first exposure time; setting a second exposure time of the image sensor so that, in an image obtained by capturing a subject by the image sensor, a plurality of bright lines corresponding to the plurality of exposure lines included in the image sensor appear according to a change in luminance of the subject; obtaining a bright line image including the plurality of bright lines; and obtaining information by demodulating data specified by a pattern of the plurality of bright lines.

U.S. Pat. No. 9,335,766 B1 to Silver et al describes a vehicle that may distinguish between dynamic obstacles and static obstacles. Given a detector for a class of static obstacles or objects, the vehicle may receive sensor data indicative of an environment of the vehicle. When a possible object is detected in a single frame, a location of the object and a time of observation of the object may be compared to previous observations. Based on the object being observed a threshold number of times, in substantially the same location, and within some window of time, the vehicle may accurately detect the presence of the object and reduce any false detections.

U.S. Pat. No. 9,652,985 B2 to Myer describes a vehicle guidance system (VGS) that facilitates interaction between human operated vehicles (HOV), autonomous driverless vehicles (ADV), and/or semi-autonomous vehicles, on the roadway, allowing safe interface with each other and with other elements, for example, weather conditions, traffic control systems, road conditions, obstructions that enter the roadway (people, rocks, animals, debris falling onto roadway from other vehicles), etc. The system provides guidance, communication, and control for the vehicles on the roadway, by using a solar-powered system comprising post assemblies having solar panel(s), sensors, forward and/or downward lighting, and other indicators/alarms to signal to the vehicle or driver regarding road, bridge, weather, accident, speeding, or other conditions of concern in the vicinity for safety and/or operability of the vehicle/driver(s).

Notwithstanding the prior art, the present invention is neither taught nor rendered obvious thereby.

SUMMARY OF INVENTION

The present invention is directed to an autonomous vehicle dual traffic reflector device for detecting a second vehicle by a first vehicle. It includes: a) an outer array, the outer array having a plurality of light receiving-light transmitting lens, the outer array positioned in an arcuate arrangement having at least one focal point and the outer array having at least two lenses selected from the group consisting of caution-colored lenses, colored lenses, clear lenses and combinations thereof; b) an inner array of reflective mirrors positioned inside the outer array and between the outer array and a focal point of the at least one focal point of side outer array, the inner array positioned to receive light passing into the device through at least one lens and reflecting the light out of the device through at least one different lens, the different lens being at least one of the at least two lenses; and c) a wireless communication component with a power source, the component being located at and connected to the device, and selected from the group consisting of: (i) a receiver for receiving information from a central control base via satellite; (ii) a transmitter for transmitting information to a central control base via satellite; (iii) a receiver for receiving information from an autonomous vehicle via wireless transmission; (iv) a transmitter for transmitting information to an autonomous vehicle via wireless transmission; and (v) any combination thereof. When the autonomous vehicle and the second autonomous vehicle are traveling toward one another in opposite directions and a light beam from the first autonomous vehicle enters an autonomous vehicle dual traffic reflector device and reflects therein to be transmitted in a recognized light to the second vehicle, the second vehicle sensor relays angle and distance information to its computer to make necessary lane adjustments to avoid vehicle collision, and when a wireless communication is sent or received, that communication is recognized, interpreted and acted upon. In some embodiments, the inner array of reflective mirrors may be positioned to receive light passing into the device through at least one lens and reflecting the light out of the device through at least one lens of at least two caution-colored lenses. In other embodiments, the lenses could be clear, or combinations of clear and any colored lenses. In addition, at least one of the at least two lenses may include an offset colored symbol that will transmit information by light reflection therethrough.

In some embodiments of the present invention, the wireless communication component with a power source further includes at least one light connected thereto for activation to signal a message through the outer array.

In some embodiments of the present invention, the arcuate arrangement is selected from the group consisting of sinusoidal, arc of fixed radius, arc of varying radius, circle and polygon.

In some embodiments of the present invention, there are at least four lenses, each being in a different plane from the others.

In some embodiments of the present invention, there are at three to twelve reflectors in the inner array, each in a different plane from the others.

In some embodiments of the present invention, the wireless component includes all of: (i) a receiver for receiving information from a central control base via satellite; (ii) a transmitter for transmitting information to a central control base via satellite; (iii) a receiver for receiving information from an autonomous vehicle via wireless transmission; (iv) a transmitter for transmitting information to an autonomous vehicle via wireless transmission, and wherein the wireless component may receive messages from an autonomous vehicle and send it to the central control base and vice versa.

In some embodiments of the present invention, the reflectors are selected from the group consisting of flat reflectors, curved reflectors and combinations thereof.

In some embodiments of the present invention, the power source is selected from the group consisting of solar panels, wind generators, batteries, grid power, and combinations thereof.

In some embodiments of the present invention, the arcuate arrangement of the outer array is circular and the caution-colored lenses are colored selected from the color group consisting of red, orange, yellow and combinations thereof.

In other embodiments of the present invention, the present invention is an autonomous vehicle dual traffic reflector detector guidance system, which includes: a) a plurality of autonomous vehicles including a first autonomous vehicle and a second autonomous vehicle, each of the plurality of autonomous vehicles having a forward projecting light that includes vectors of light beams directed away from a lane of travel and light receiving sensors that recognize caution-colored light, including angle and distance, and including computer adjustment to lane positioning; b) a plurality of roadways having at least two lanes of travel, including a first lane for travel in a first direction and a second lane for travel in a second direction, the second direction being opposite the first direction, the roadways further including side areas outside of the first lane and the second lane; c) a plurality of autonomous vehicle dual traffic reflector devices for detecting a second the autonomous vehicle by the first autonomous vehicle located along the side areas of the plurality of roadways wherein each of the devices include: i) an outer array, the outer array having a plurality of light receiving-light transmitting lens, the outer array positioned in an arcuate arrangement having at least one focal point and the outer array having at least two lenses selected from the group consisting of caution-colored lenses, colored lenses, clear lenses and combinations thereof; ii) an inner array of reflective mirrors positioned inside the outer array and between the outer array and a focal point of the at least one focal point of side outer array, the inner array positioned to receive light passing into the device through at least one lens and reflecting the light out of the device through at least one different lens, the different lens being at least one of the at least two lenses; and iii) a wireless communication component with a power source, the component being located at and connected to the device, and selected from the group consisting of: (i) a receiver for receiving information from a central control base via satellite; (ii) a transmitter for transmitting information to a central control base via satellite; (iii) a receiver for receiving information from an autonomous vehicle via wireless transmission; (iv) a transmitter for transmitting information to an autonomous vehicle via wireless transmission; and (v) any combination thereof. When the autonomous vehicle and the second autonomous vehicle are traveling toward one another in opposite directions and a light beam from the first autonomous vehicle enters an autonomous vehicle dual traffic reflector device and reflects therein to be transmitted in a recognized light to the second vehicle, the second vehicle sensor relays angle and distance information to its computer to make necessary lane adjustments to avoid vehicle collision, and when a wireless communication is sent or received, that communication is recognized, interpreted and acted upon. In other words, when the first autonomous vehicle and the second autonomous vehicle are traveling toward one another in opposite directions or toward each other at a cross road or merge, and a light beam from the first autonomous vehicle enters an autonomous vehicle dual traffic reflector device and reflects therein to be transmitted in a reflected light to the second vehicle, the second vehicle sensor relays angle and distance information to its computer to make necessary lane adjustments and other possible adjustments, such as acceleration, deceleration, and/or stopping, to avoid vehicle collision.

In some embodiments of the present invention guidance system, the plurality of autonomous vehicles includes a computer that, at least in part, travels in conjunction with a satellite GPS guidance system in coordination with the autonomous vehicle dual traffic reflector detector system. In addition, all of the other detailed features of the present invention device described in the above paragraphs of this section may be included features of the present invention guidance systems. Further all of the specific embodiments and characteristics for the device described herein above are likewise applicable to the devices used in these systems embodiments.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE SEVERAL VIEWS OF THE DRAWINGS(S)

The accompanying drawings, which are included to provide a further understanding of the invention and are incorporated in and constitute a part of this specification, illustrate preferred embodiments of the invention and together with the detailed description serve to explain the principles of the invention. In the drawings.

Figure 15:
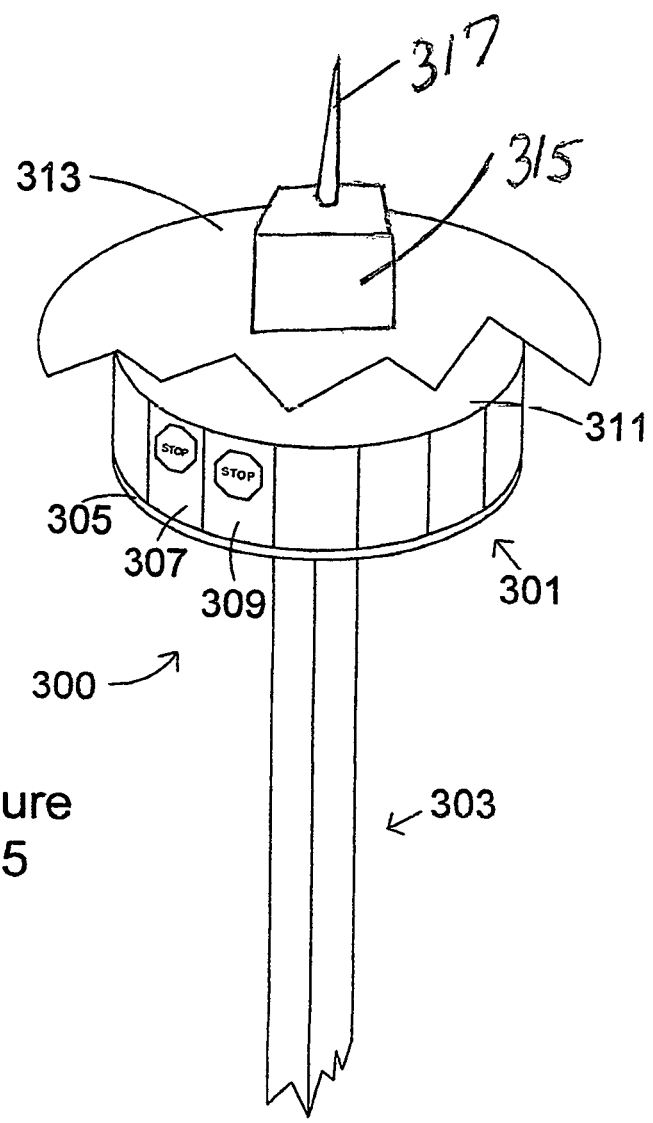
Figure 16:
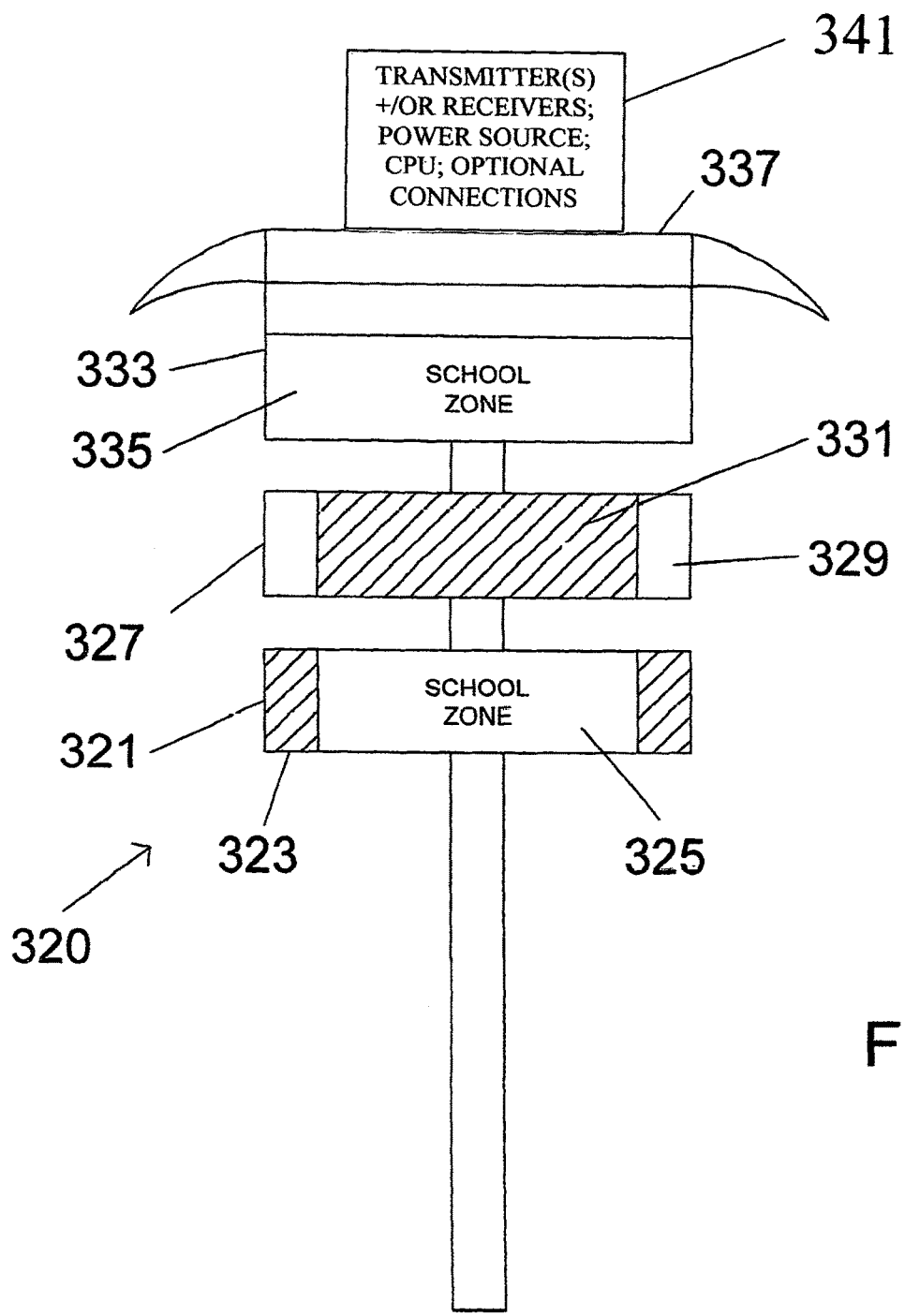

FIG. 15 shows front oblique view of a present invention device with 360 degree surround rectangular lenses, to maximize use of incoming and outgoing light signals that includes sensors and a wireless communications station; and, FIG. 16 shows a front view of a stacked arrangement of present invention reflector detector devices that includes sensors and a wireless communications station, including diverse shielding sections, particularly useful for four way, partially or fully obscured, intersections.

DETAILED DESCRIPTION OF THE EMBODIMENTS

The present invention devices and systems are more fully understood by the following examples in conjunction with this detailed description of the drawings. The present invention autonomous vehicle dual traffic reflector device has been developed for many purposes and especially for detecting a second vehicle by a first vehicle. The term "autonomous" should be broadly interpreted as used herein, and thus encompasses completely autonomous vehicles, partially autonomous vehicles, and vehicles with an auto pilot type of functionality. The term "vehicle" as used herein should be broadly interpreted and includes, but is not limited to, single and multiple passenger vehicles, motorcycles, automobiles, trucks, buses, watercraft, such as jet skis, boats and barges, snowmobiles, off road vehicles, ground travelling planes (such as runway taxiing), and military and commercial vehicles. By "offset colored" is meant a different color from the lens, such as a clear lens could have a black or red Aztec code, or red lens could have a clear colored symbol of a color that is recognizably offsetting the lens color. The term "symbol" should be taken broadly to include any symbol or group of symbols that transmits information. By "information" is meant any useful data that an autonomous vehicle, a driver, a controller or a computer involved in vehicle control would be of use. Examples of transmitted information include speed limits, location of device, distance from a start point (such as highway or waterway mile markers), an ID number, longitude/latitude, warnings and other vehicular messages (e. g., steep grade; bridge ahead; road narrows; blind child; deer crossing; school zone; parking meters; bridge height; school bus stops; hospitals; EZ pass; toll roads; post office; government building; mail boxes; gas station; commercial drive-thru; Shopping mall; railroad crossing; state border; required lane changes; merge; stop; yield rest areas; park; boat ramp; water depth, etc.). The offset symbols include any recognized symbol and may take any workable form to hide, reduce or change light transmittal, such as a decal, painting, etching, light transmitting insert or add on, such as printed or otherwise prepared glass, plastic or metal insert. These symbols may be singular or multiple and may be a bar code, an Aztec code, numerals, letters or one or more set symbols. A set symbol is a unique symbol that is part of a set of symbols that work together to communicate. Set symbols include, but are not limited to alphabets, contrived or created sets of symbols (such as one, and then two and then three sides of a triangle, followed by one, then two, then three, then four sides of a square to make a new symbol set and to assign meaning to these), shapes, such as a yield triangle, a stop sign hexagon, a deer head, an X for RR crossing, etc. The symbols are reflected through, with the light to the receiving vehicle and thus transmit the information (data and/or message). Thus, in all of the descriptions below, it is understood that one or more symbols is incorporated into one or more lens for information transmission to a receiving vehicle.

In the present invention devices, there are at least two lenses (caution-colored, colored or clear, or combinations thereof), as well as one or more of: a wireless communication component with a power source, the component being located at and connected to the device, and selected from the group consisting of: (i) a receiver for receiving information from a central control base via satellite; (ii) a transmitter for transmitting information to a central control base via satellite; (iii) a receiver for receiving information from an autonomous vehicle via wireless transmission; (iv) a transmitter for transmitting information to an autonomous vehicle via wireless transmission; and (v) any combination thereof. In addition, as an added option in some embodiments, one of the at least two lenses may include an offset colored symbol that will transmit information by light reflection therethrough.

The primary objective of having both the reflector detector devices and the adjunct wireless communication systems is to provide increased accuracy, redundancy and a safer overall guidance system. In some embodiments, the wireless communications systems may be the same as those proposed in the prior art, such as wireless controls from vehicle to satellite to control computers (central processors) and back to the same and/or other vehicles. But even using prior art wireless technology and guidance, the present invention system is enhanced by the fact that the devices, and thus wireless communications, are positioned along travel ways in cavernous roads, tunnels, etc. where signals can be transferred to other receivers and sent to satellite.

However, in preferred embodiments, the wireless communications systems operate in cooperation with the reflector detector devices. Light generated information received and transmitted via the reflector detector devices may be sensed by the wireless communications systems and thus additional "passive" data will be transmitted to the central control units via satellite and, in some embodiments return additional guidance information to the nearby vehicle(s).

The autonomous vehicle dual traffic reflector devices of the present invention are installed in vehicles to operate either; (1) with on-board computers that already in place for guidance and/or other systems; (2) with their own dedicated modules; or (3) a combined connected set of both of the foregoing. As with any on-board computer, some form of power is a given—battery, solar, fuel cell, other, hybrids. For simplicity, the functional computer or computer part(s) that operates, sends signal, receives signal, recognizes and interprets incoming symbols, integrates and makes travel adjustments, shall be referred to as the reflector guidance module, to encompass all of (1) with on-board computers that already in place for guidance and/or other systems; (2) with their own dedicated modules; or (3) a combined connected set of both of the foregoing. Thus, the first vehicle sends out a light signal with information (again broadly interpreted, as this light may be visible, invisible, or combinations thereof), with one or more symbols, or not, depending on direction of travel (as an example, a vehicle traveling south toward a school zone will see the symbol for that, but a vehicle that just left the school zone going north will see devices without a school zone symbol). That light signal may do one, two or three different things when it arrives at the autonomous vehicle dual traffic reflector device. First, it splits so that part of it (1) travels to an oncoming second vehicle, if any; and possibly and preferably (2) travels back to the (sending) first vehicle to enhance its position recognition when used in conjunction with GPS or other primary location information. An oncoming second vehicle with its own reflector guidance module, when it receives the sent signal, will intake the signal, recognize its source (the present invention fixed location autonomous vehicle dual traffic reflector device), enhance (fine tune) its own location when used in conjunction with GPS or other primary location information, and make travel adjusts where necessary to avoid collision or close encounters with the first vehicle. Second, it may additionally send out a symbol or info message, such as described as an optional feature, above. Third, it may be sensed by the wireless communications systems and processed accordingly to provide information wirelessly to a central processor (control system) via satellite and/or to other vehicles. Additionally, the wireless communications systems may be used independently of the device to covey its own information to and from vehicles, such as real time positions, speeds, directions, very accurate trackings, warnings, such as "icy road ahead . . . make speed adjustments", "accident ahead . . . stop", "wide load . . . caution", etc. while these messages are written here in words for humans to understand, the messages may take other action or reaction courses with our without human friendly explanations.

In some embodiments, a visible colored light source, or an infrared or other invisible light source emitting from a first autonomous vehicle reflects back to that first autonomous vehicle to be noticed by the first autonomous vehicle or semi-autonomous vehicle locking in its accurate location to be signaled to a second autonomous vehicle operating more accurately to travel in a preferred safe path or road, not to be diverted, as if on a virtual rail system. In some refined embodiments, a signal sent from the first autonomous vehicle using the present invention dual traffic reflector detector system will be based on the set reflector angles and thus set a predetermined distance ahead of the first semi-autonomous or autonomous vehicle, to signal oncoming traffic ahead of its approach to make accurate onboard autonomous vehicle corrections if needed, included wheel turning adjustment(s), slowing down, accelerating, or even braking and stopping completely.

The autonomous vehicle dual traffic reflector devices of the present invention are advantageously and readily utilized at night but are also adapted for daylight use. This daytime use may be accomplished by deeply recessed reflector panels within the devices or may be accomplished with various shields, such as an enlarged top cap with overhang to avoid most sunlight entering the devices. Alternatively, the lens, reflectors and receptors may be designed for discriminating reflected light signals in daylight with ultra-sensitive accuracy.

The autonomous vehicle dual traffic reflector devices of the present invention have reflector panels that may be flat or curved, and, in some cases, are compound, so that a single panel may reflect light in different directions and/or split the light so as to partially return some of the light back to its source. This may be achieved by using panels having diverse areas such as a panel with flat areas and with paraboloid areas (for return reflection), or a panel with flat areas and reflective reverse pyramids. Other means for light splitting and partial advance/partial return reflection that are known to the artisan may be utilized in the alternative.

Some proponents of autonomous vehicle guidance systems suggest that certain wireless systems cannot rely upon current day cell towers for the desired accuracy and indicate that roadside towers spaced five hundred feet or one thousand feet apart may be necessary. In the event that such requirements are implemented, the present invention devices may be simultaneously used for those cell towers that require fixed, road spacing such present invention combination devices would synergistically reduce installations that would otherwise be separate and distinct from one and other.

Also, satellites keep time in orbit so as to be synchronized with one and other and with a base timer sometimes referred to as the grandfather clock and gate keeper clocks. In preferred embodiments of the present invention, the communication systems will be synchronized with the satellite clocks.

Figure 1A:
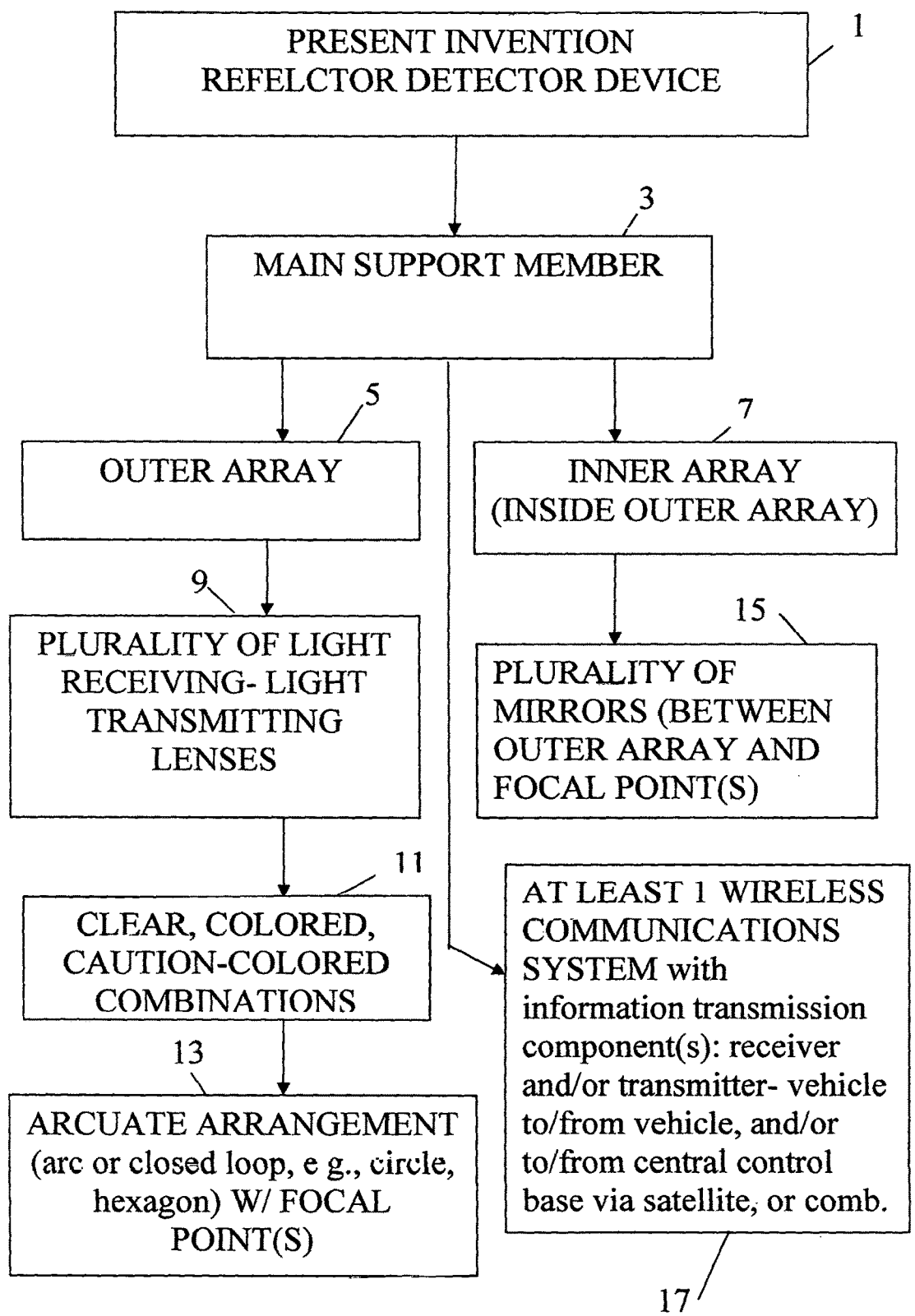
FIG. 1A shows a block diagram of various aspects of a present invention reflector detector device.

FIG. 1A shows a block diagram of various features of the present invention Reflector Detector Device 1. There is a main support member 3 for holding an outer array 5 and inner array 7. Outer array 5 has a plurality of light receiving-light transmitting lenses 9, which may be clear, caution colors, other colors or combinations thereof. The combinations of clear and cautionary color lenses are preferred. Outer array 5 has its lenses 9 arranged in an arc or a continuous loop 13 with at least one focal point. The term "arc" as used herein should be broadly construed, such that broken or connected line segments (straight at a series of angles (like a top view of a part of a hexagon or other polygon) or curved line(s)) create a part of a loop. "Closed loop" as used herein, means a continuous or continual series of parts that begin and end at the same point. Thus, a circle of parts (lenses or lenses with main support member parts between the lens) is one example of a closed loop, as would be an oval, an irregular circle, any regular or irregular polygon. Also shown in FIG. 1 is inner array 7 which is located inside outer array 5 and between outer array lenses 9 and the focal point(s) 13. Inner array 7 is a collection of mirrors with open spaces or clear parts there between. This allows some light to reflect and some to pass through to increase the possibilities of multiple sensings and/or multiple reflections. In some instances, part of the light may travel to a second present invention device and be further dispersed and then sensed from that second device. A key feature of the present invention is at least one or more wireless communications systems 17 connect to the device and are set up to either operate independently of the reflector detector devices, or in conjunction with them (sensing light and interpreting and providing guidance feedback) or operate both independently and in conjunction with the devices. For example, envision a wireless communications system that both sends out school zone ahead guidance to all oncoming vehicle and senses by light intake/sensing rapidity, that a vehicle is speeding and directs it to slow down . . . it is operating simultaneously both independently of and in cooperation with the reflector detector devices. Thus, these wireless communications systems also include: one or more of (i) a receiver for receiving information from a central control base via satellite; (ii) a transmitter for transmitting information to a central control base via satellite; (iii) a receiver for receiving information from an autonomous vehicle via wireless transmission; (iv) a transmitter for transmitting information to an autonomous vehicle via wireless transmission; and (v) any combination thereof.

Figure 1B:
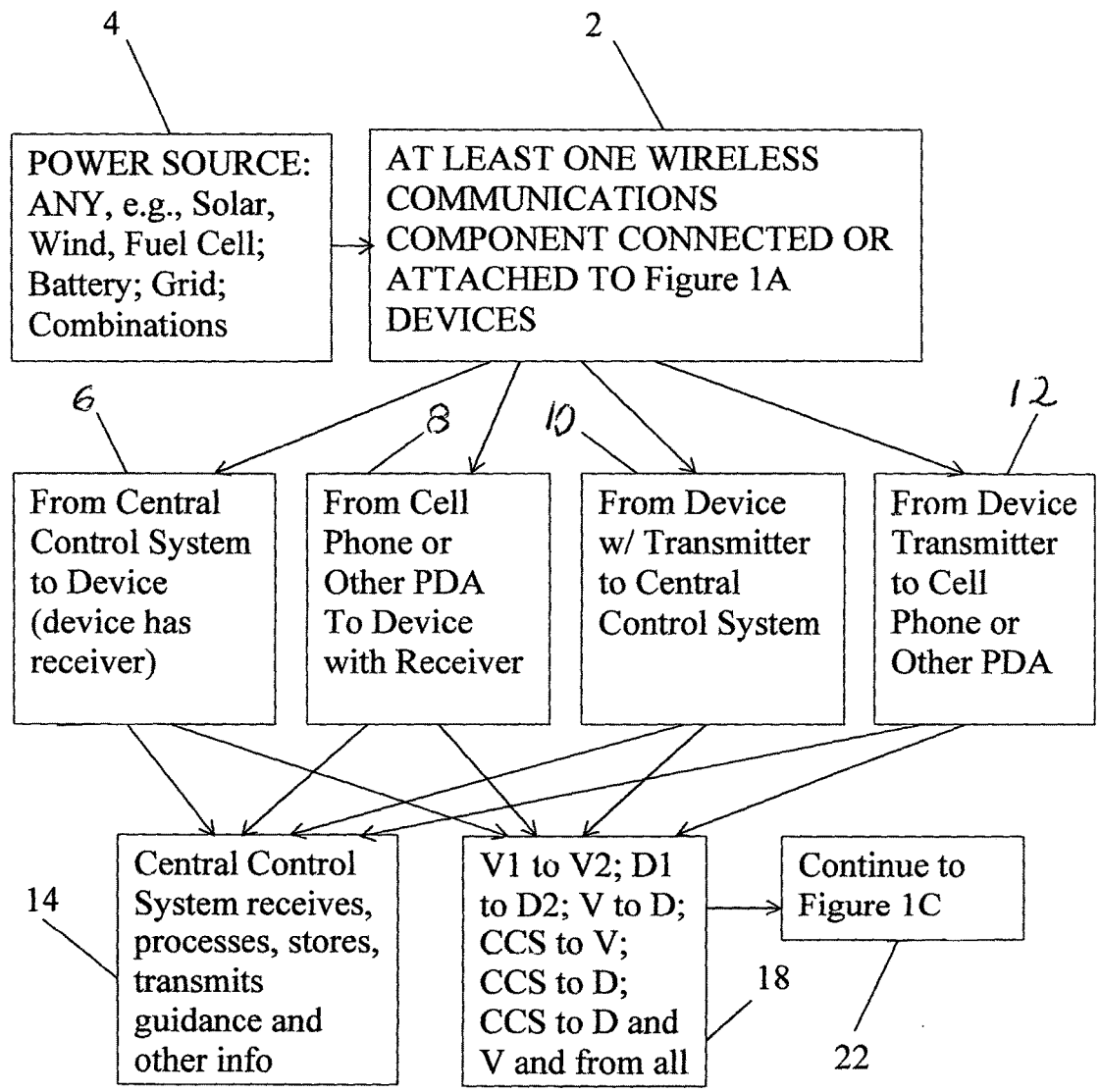
FIGS. 1B and 1C show other block diagrams showing the details of the wireless communications components and options of the present invention.
Figure 1C:
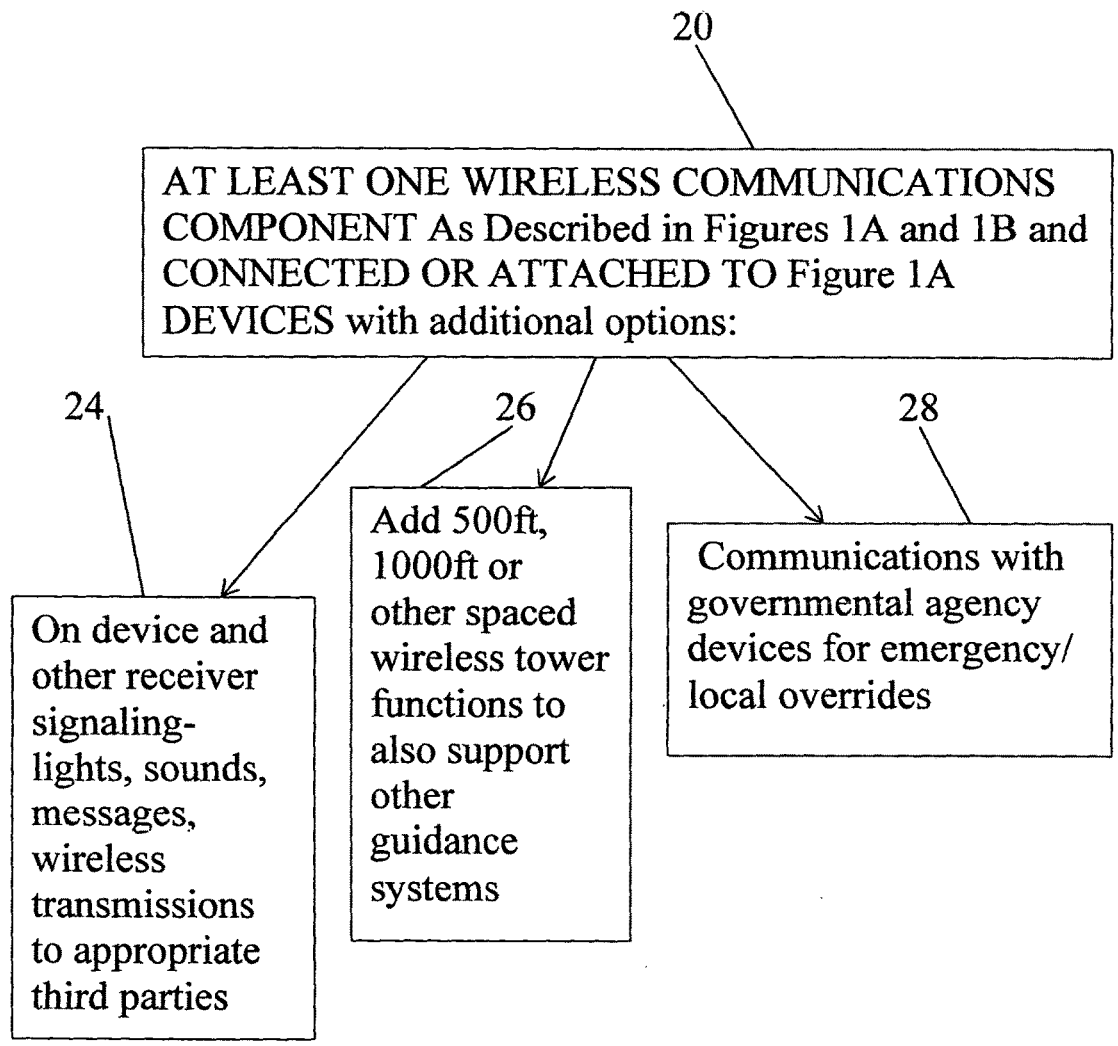

FIG. 1B and FIG. 1C illustrate the details of some features of the communications system(s) included in the present invention. Referring to FIG. 1B, block 2 shows at least one wireless communications component connected to or attached to the FIG. 1A present invention devices. Such communications (referred herein as components, devices or systems) require power. The power source 4 may be any conventional (grid) or alternative (off-grid) power source, or combinations thereof, as set forth in power source 4 of FIG. 1B. Blocks 6, 8, 10 and 12 show types of communications preferred herein, and respectively show communications from the central control system (such as in the cloud or at a control center location) to the Device communications component; from a third party or driver cell phone or other PDA to the Device communications component; from the Device communications component to the central control system; and from the Device communications component to a cell phone or other PDA. PDA should be broadly interpreted to include wireless communication capable devices such as laptops, computers, tablets, and autonomous vehicle on board computers. The central control system 14 receives, processes, stores and transmits guidance and other info and communications 18 may be from vehicle to vehicle (V1 to V2); device to device (D1 to D2); vehicle to device; control center system (CCS) to vehicle; CCS to D; CCS to D and V; and vice versa for all of these (meaning, transmitted in the opposite direction). FIG. 1C shows Device wireless communications component 20 referred to in the above described FIGS. 1A and 1B with additional feature options. These include types of signaling 24, cell tower add-ons 26 and government overrides 28.

Figure 2:
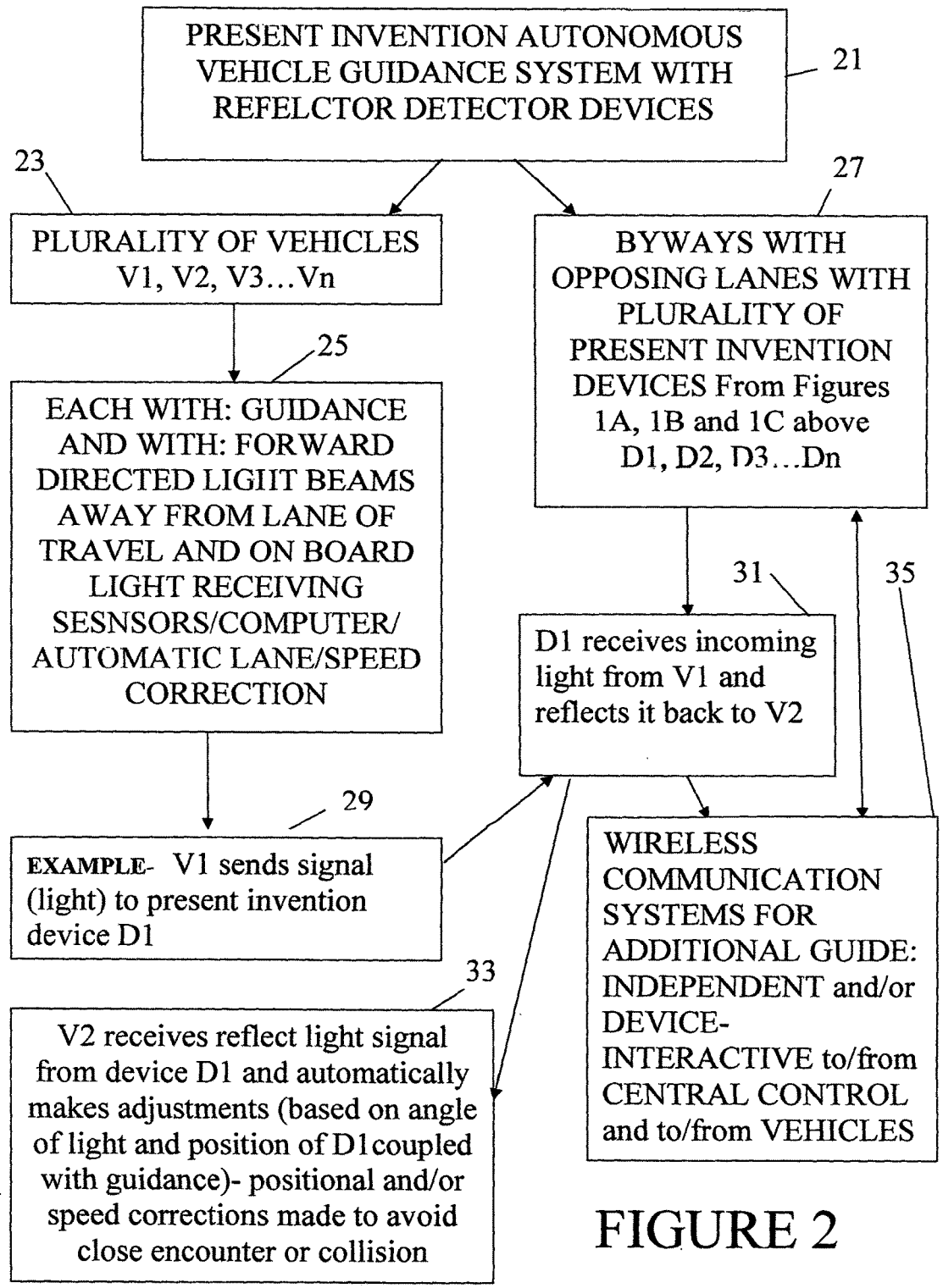
FIG. 2 shows a block diagram of various aspects of a present invention autonomous vehicle guidance system using present invention reflector detector devices as generally shown in the previous drawings.

FIG. 2 shows a block diagram of various aspects of a present invention autonomous vehicle guidance system 21 using present invention reflector detector devices on byways 27 with a plurality of the present invention devices shown in FIG. 1. The term "autonomous" is used throughout this document and is taken to mean any vehicle that is driven by an automated system, either temporarily or permanently, with or without a (backup) person as a driver. The system 21 includes a plurality of vehicles 23 on the byways, such as V1, V2, V3 . . . to Vn, where n is any number larger than 3. Each of these vehicles 23 includes guidance (as in conventional existing autonomous vehicles with GPS or similar systems), and includes light beams directed away from the lane of travel, as well as onboard light-receiving sensors, and computer control module that receives, interprets and acts upon the receive information (reflected light angle and device location) to correct the movement of the vehicle, as needed to avoid a collision or near miss, by automatic speed and lane correction 25. As an example, V1 sends a light signal 29 to device D1, which receives the incoming light from V1 and reflects it 31 back to V2. V2 receives that signal and automatically makes adjustment as needed 33. Not shown, but likely, is light from V2 also passes through D1 and is received by V1 for action as needed. Further, wireless communications systems 35 add additional guidance by operating independently from and/or reflector deflector device interactive (sensing light of autonomous vehicles passing therethrough and transmitting to the central control system and then back to the vehicles for additional fine tuning of guidance.

Figure 3:
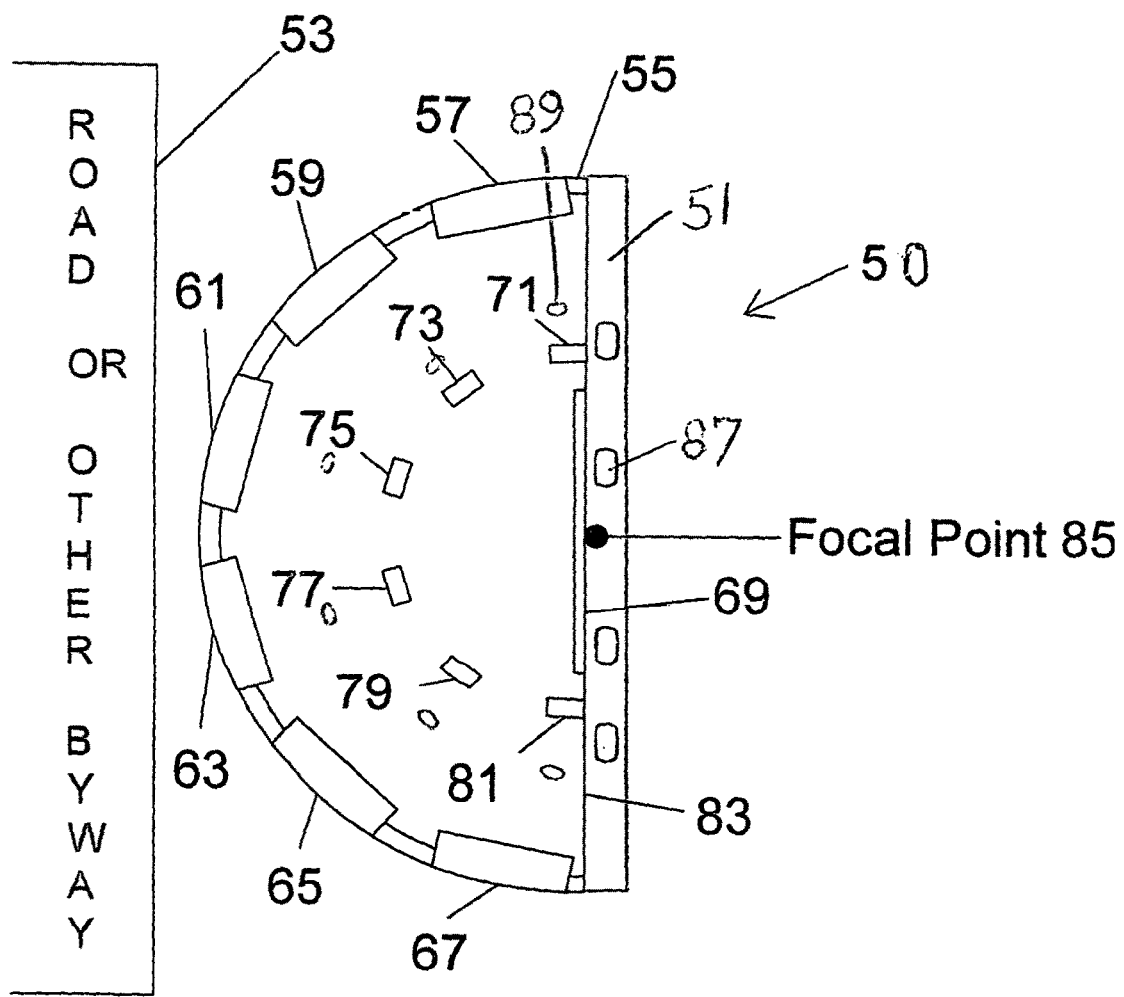
FIG. 3 shows a top view of an embodiment of a present invention reflector detector device having an open loop top view configuration with communications sensors and a rear mounted wireless communications package.

FIG. 3 shows a top view of an embodiment of a present invention reflector detector device 50 having an open loop top view configuration. There is a road or byway 53. "Byway" can be any surface upon which vehicles are driven, highways, streets, lanes, back roads, off road pathways, runways, plane taxiways, boat channels, tunnels, military movements, etc. The present invention system is especially beneficial in tunnels and other byways where GPS systems may be blocked, such as underground garages, canopied drive-thrus, cliff overhangs, heavy overhead foliage, over/ under roadways, and under bridges.

The present invention device 50 has a support structure 83 that may be a single or a multi-component support member, such as metal or plastic or rigid foam or other structure that can withstand outdoor weather, as well as combinations thereof. The structure may be mounted on a post, attached to a pole or suspended, depending upon the availability of existing sub-support members at its installed location. It would be reasonable to permanently attach it to a roadside via a post and footing, but if an existing pole or other available existing structure is present, it could be mounted to that existing structure. And, for example, if roadside overhead structures exist, suspension therefrom of present invention device is also possible. Outer array 55 is a half-circle in this embodiment and has a focal point 85. The outer array 55 includes clear lenses and here, has no cautionary colored lenses, but additional embodiments described below do have cautionary colored lenses. In this outer array 55, the lenses are shown as lens 57, 59, 61, 63, 65 and 67. Inner array is comprised of separated stand-up reflectors 71, 73, 75, 77, 79 and 81 arranged in an arc between the outer array 55 and focal point 85. They are strategically positioned to receive light from oncoming vehicles and reflect it to a second vehicle, as described above and below.

Also shown in FIG. 3 is the wireless communications system 51 attached to device 50. In this embodiment, and enhanced wireless communications system 51 is used that includes receiver and transmitter for communications to and from vehicles, PDAs and satellite to the central control system. In addition, there are upwardly extending warning lights 87 visible from roadway 53, that may be activated along with wireless warnings to vehicles that caution is necessitated, such as when an accident occurs and is inputted into the system. Further, this wireless communications system 51 has light sensors positioned strategically between the lenses and the reflective mirrors to sense incoming and outgoing light and to send sensor signals to the wireless communications device for central control system software to interpret and provide useful guidance feedback to vehicles and/or authorities and/or to activate warnings when appropriate. There are also light sensors, such as sensor 89, connected to wireless communications system 51 and positioned between the lenses and the mirrors to sense incoming and/or outgoing light and to feed that information to wireless communications system 51 for at-location processing or to central control for processing, via satellite. This information provides speed and location of the light transmitting vehicle and, when combined with other information, may afford fine-tuning of vehicle locations as well as enhanced guidance directive to the autonomous vehicles. In addition, the wireless communications system 51 may have independent wireless sensing and other information to and from the vehicles and to and from the central control computers to also provide enhanced vehicle guidance (by adjusting speed, direction and even stopping and/or turning around to seek an alternative route, if necessary, such as when there is a roadblock, flood, significant accident, etc.). Once the additional data is fed into the system, existing programs may add the new fine-tuning information to make safe adjustments.

Figure 4:
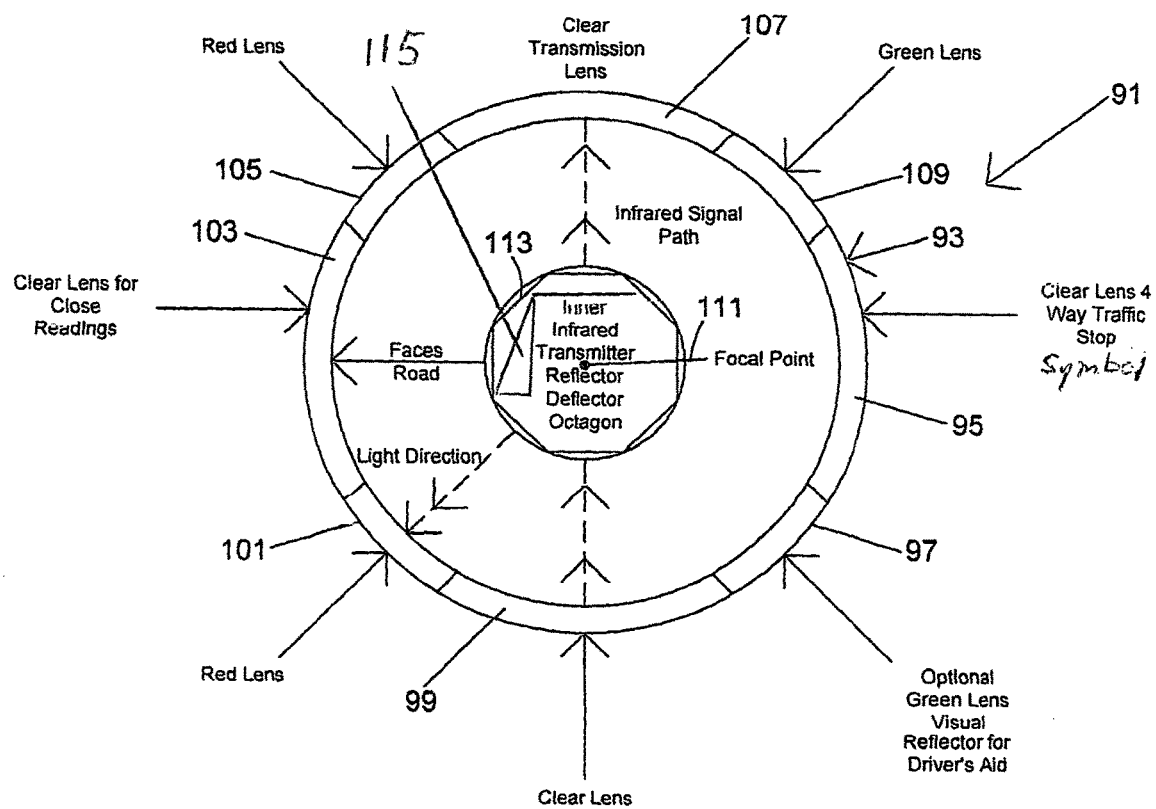
FIG. 4 shows a top view of an embodiment of a present invention reflector detector device having a closed loop top view configuration that includes infrared sensors and a wireless communications station.

FIG. 4 shows a top view of an embodiment of a present invention reflector detector device having an closed loop top view configuration 91. It includes a main support structure 93, which may have a general configuration like a round cookie tin with a sealed top. Various lenses are included, and are colored or not, as indicated in the drawing. These lenses include lenses 95, 97, 99, 101, 103, 105, 107 and 109, with focal point 111. This device 91 may be beneficial for intersections as well as roadside uses as it has universal angles. Inner array 113 has a plurality of reflective mirrors arranged in an inner circle and may have facets with reflective and clear sections to enhance light transference. A wireless communications system 115 is located in the center of device 91 and functions independently in this embodiment to create to separate and unique beneficial feedbacks to vehicles, one that is passive from the reflectors and one that sends signals to vehicles to enhance guidance based on road, weather and traffic conditions as acquired by satellite and vehicle user (computer) automatic feedback. In general, wireless communications system 115 may be similar to those described above and below and may be with or without light sensors and, thus, interactive with and/or independent from the reflector detector features and action.

Figure 5:
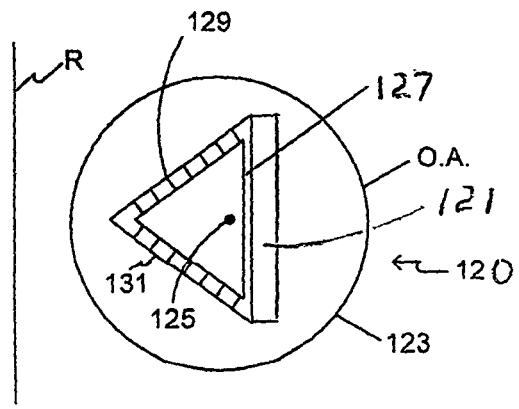
FIG. 5 shows a top view of an embodiment of a present invention reflector detector device having a circular top view configuration that includes sensors and a wireless communications station.

FIG. 5 shows a top view of an embodiment of a present invention reflector detector device 120 having a circular top view outer configuration 123 for its outer array of lenses, and a triangular inner array having road R facing back side 127 with a solid continuous inside mirror surface, and two angled sides 129 and 131 with alternating mirror and clear or open areas, to enhance receiving and reflecting light sensing. The wireless communications system 121 is attached to device 120 and may be any of those previously described.

Figure 6:
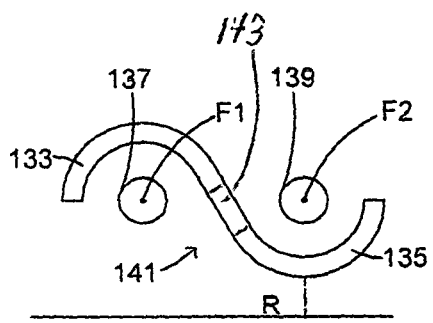
FIG. 6 shows a top view of an embodiment of a present invention reflector detector device having a sinusoidal top view configuration that includes sensors and a wireless communications station.

FIG. 6 shows a top view of an embodiment of a present invention reflector detector device 141 having a sinusoidal top view configuration. This present invention device has one outer array that is sinusoidal and has two halves and two different inner arrays. The first half 133 has a focal point F1 and operates in conjunction with reflective inner array 137, which preferably has mirror and clear segments; the second half 135 operates in conjunction with second inner array 139 with similar mirror and clear segments as array 137. This unusual configuration may be useful anywhere, but especially on road segments in the form of doglegs, s curves and U-shaped curves. The wireless communications system 143 is attached to device 141 and may be any of those previously described.

Figure 7:
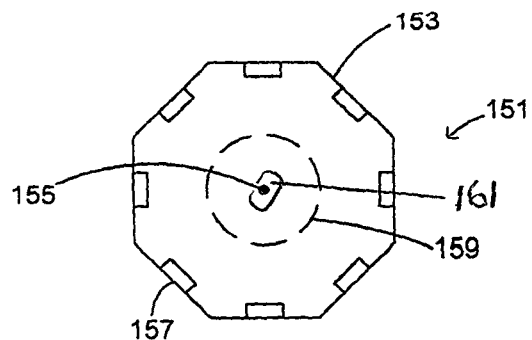
FIG. 7 shows a top view of an embodiment of a present invention reflector detector device having a polygonal top view configuration that includes sensors and a wireless communications station.

FIG. 7 shows a top view of an embodiment of a present invention reflector detector device 151 having a polygonal top view configuration with an outer array 153 with a plurality of lenses such as lens 157, which may be any combination of colors/clear, as described above. The inner array 159 is inside outer array 153 and outside focal point 155. The inner array 159 may have any of the above-described configurations, lenses shapes and positions. The wireless communications system 161 is attached to device 151 and may be any of those previously described.

Figure 8:
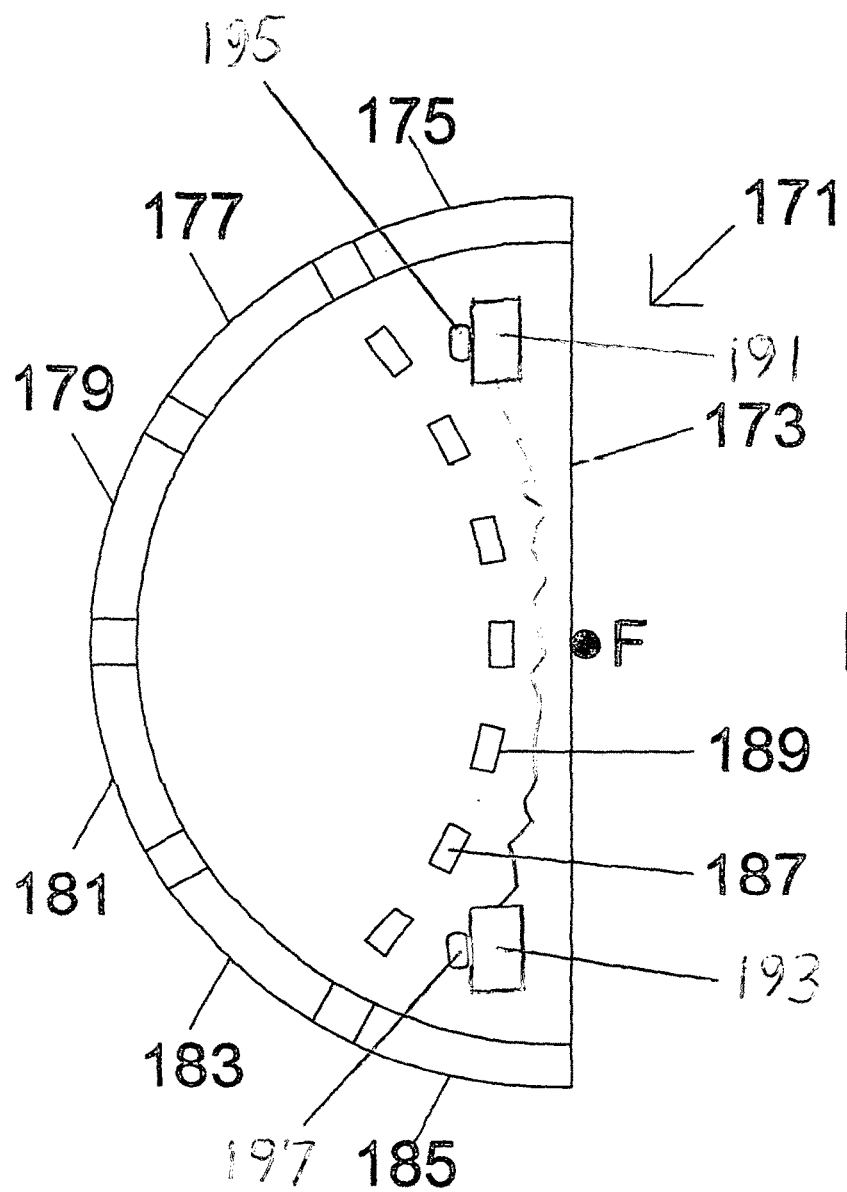
FIG. 8 shows a top view of an embodiment of a present invention reflector detector device having an arc of a fixed radius top view configuration that includes sensors and a wireless communications station.

FIG. 8 shows a top view of an embodiment of a present invention reflector detector device 171 having an outer array 175 and an arc of a fixed radius with focal point F, and with a reverse (facing opposite direction) directed inner array arc made up of a plurality of reflective mirrors, such as mirrors 187 and 189. The spaces between the mirrors may allow light to hit the back of support structure 173, which also may optionally be a mirrored surface. Outer array 175 has a plurality of lenses 177, 179, 181, 183 and 185. Two wireless communications systems 191 and 193 are located within device 171 and are wired to one another for data accumulation and transmittal to, and feedback from central control computers and transmittal to vehicle on-board computers. There are also light sensors 195 and 197 to collect light (and the vehicle that light represents) as it enters and leaves the device 171. This can be used to calculate speed and to make vehicle changes as may be needed.

Figure 9:
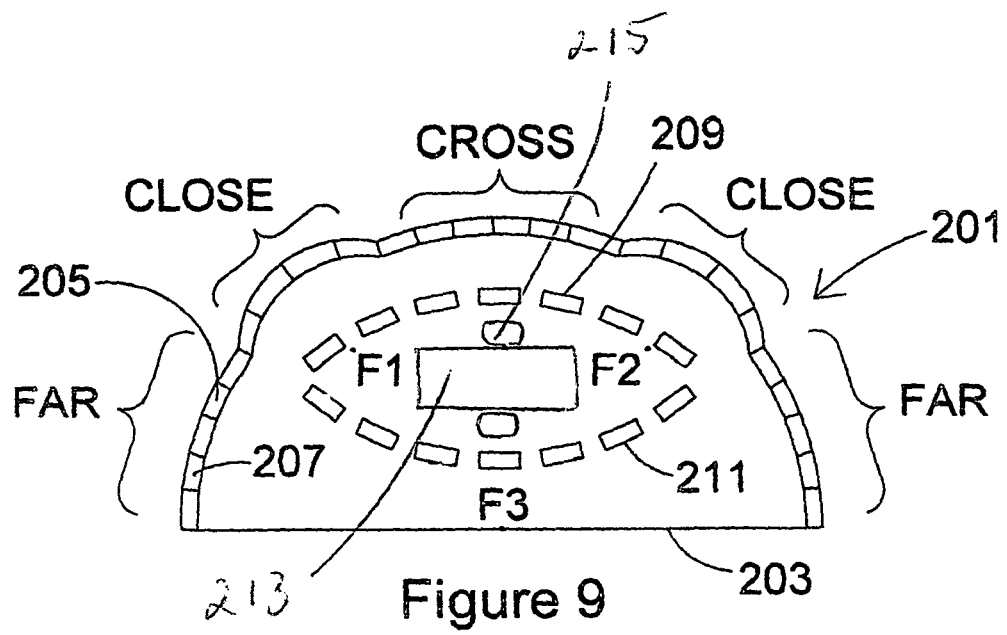
FIG. 9 shows a top view of an embodiment of a present invention reflector detector device having an arc of varying radius top view configuration that includes sensors and a wireless communications station.

FIG. 9 shows a top view of an embodiment of a present invention reflector detector device 201 with support structure 203, outer array 205 and inner array 211 with two sided mirrors such as mirror 209. In this configuration, the outer array has at least two focal points including F1, F2 and F3. Inner array 211 is positioned between focal point F3 and outer array 205. As can be seen, parts of the outer array are based on large radii (not shown) emanating from focal point F3 to receive light from relatively far distances at its sides and right angle lights at its fronts. In between are small radius arcs emanating from focal points F1 and F2 to receive light from relatively close sources. The wireless communications system 213 is attached to device 201 and may be any of those previously described. It has dual upwardly extended warning lights, such as light 215.

Figure 10:
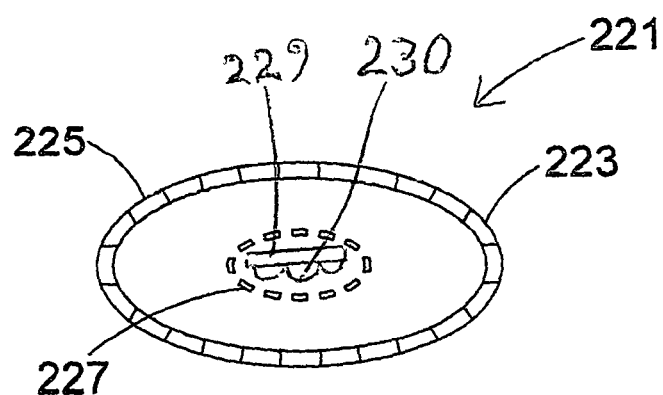
FIG. 10 shows a top view of an embodiment of a present invention reflector detector device having a oval top view configuration.

FIG. 10 shows a top view of an embodiment of a present invention reflector detector device 221 having a oval top view configuration. It includes outer array 223 with multiple, diverse lenses such as lens 225. Inner array 227 with reflective mirrors is likewise oval in shape and may utilize any individual mirrors spacings such as described above. The wireless communications system 229 is attached to device 221 and may be any of those previously described. It has triple upwardly extended warning lights, such as light 230 and these may be stationary or flashing or otherwise as desired to enhance signaling.

Figure 11:
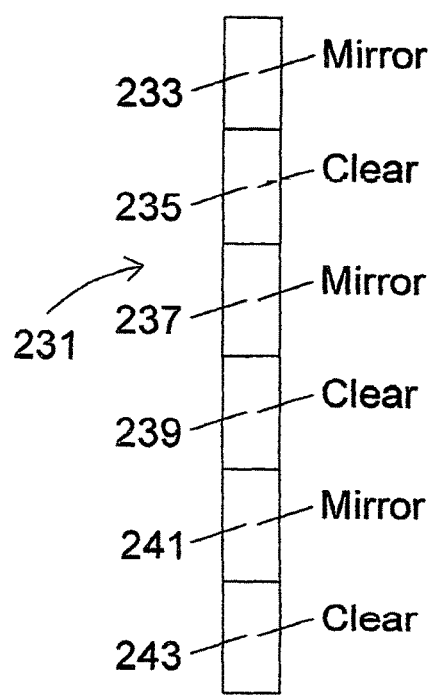
FIGS. 11 and 12 illustrate different reflector shapes.
Figure 12:
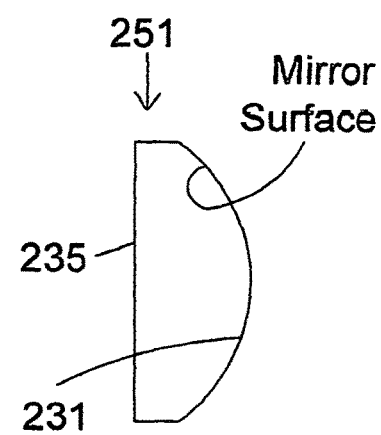

FIGS. 11 and 12 illustrate different reflector shapes. In FIG. 11, a lens 231 has segments of alternating reflective and clears surfaces. Specifically, segments 233, 237 and 241 are mirrored or as segments 235, 239 and 243 are clear. FIG. 12 shows reflective mirror 221 with a flat outer surface 255 and a concave surface 253 so as to capture incoming light and reflect that incoming light from many more angles than a flat surface might successfully reflect from a first vehicle to another vehicle.

Figure 13:
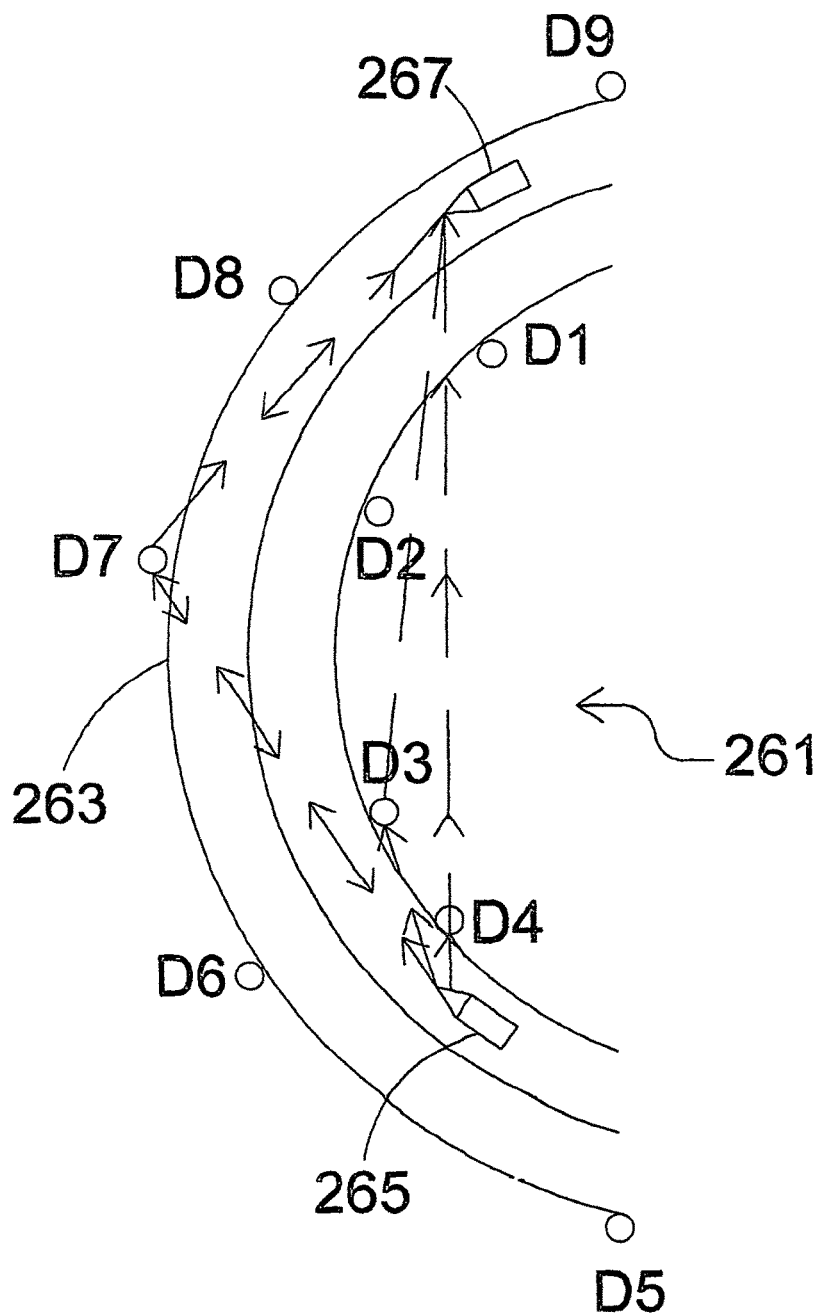
FIGS. 13 and 14 show top views of a system with different scenarios of opposing autonomous vehicles approaching one another with present invention reflector detector devices assisting in travel guidance.
Figure 14:
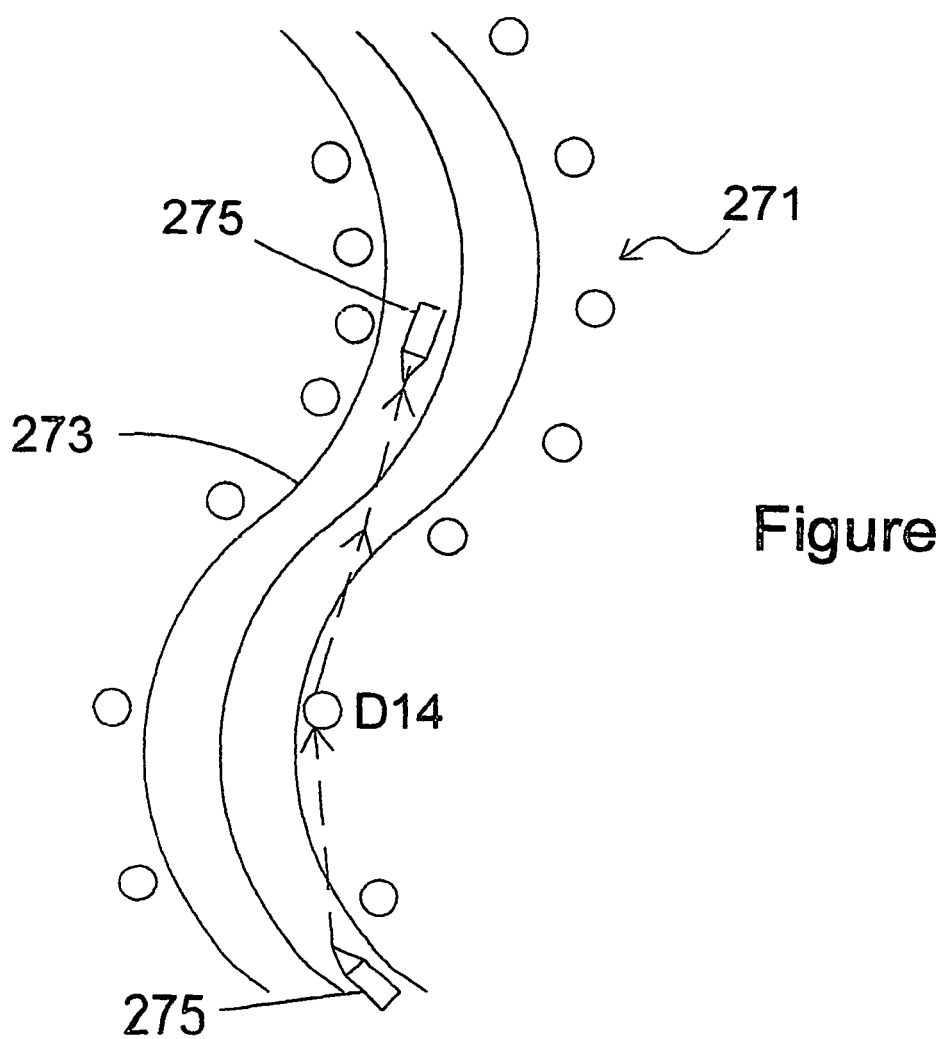

FIGS. 13 and 14 show top views of a system with different scenarios of opposing autonomous vehicles approaching one another with present invention reflector detector devices assisting in travel guidance. FIG. 13 shows a top view of one scenario around a sharp curve on road way 263 wherein vehicle 265 and vehicle 267 are approaching one another from opposite directions but cannot see each other. The road way 263 has present invention vises D1 through D9. Light emanating from vehicle 265 may be received by devices D3, D4 and D7 and that light will reflect back to vehicle 267 as a warning and as a supply of information to be relied upon for fine tuning lane positioning and collision avoidance. The present invention devices may specifically be any such present invention devices as contemplated by the description herein paragraph. FIG. 14 shows a present invention system 271 with an S-shaped road way 273 and a plurality of present invention devices including one designated as D14. Light emanating from vehicle 275 traveling northward is received by device D14 and reflected to vehicle 277 traveling south toward vehicle 275. This information will be updated as the vehicles drive closer to each other in a sense that more transmitted (reflected) light at closer angles will provide additional information for the guidance systems to use for lane maintenance and collision avoidance. While FIG. 14 shows light coming from vehicle 275 that is received by vehicle 277, in general, the opposite will also occur. In other words, light will also emanate from vehicle 277 and be reflected to vehicle 275 to provide additional data for guidance of autonomous vehicle 275. Additionally, FIG. 14 is simplified in that only one present invention device is shown receiving and reflecting light with the arrows showing one direction. In reality, multiple devices on side of the road at different or at the same time will be receiving light and reflecting light in one or both directions to further significantly fine tune each vehicles guidance toward and past one another. The left-most set of arrows in FIG. 13, thus, has arrowheads showing light paths traveling in both directions. In both FIGS. 13 and 14 one or more wireless communications system are attached to the devices and may be any of those previously described to operate independently of or in conjunction with the reflector detector devices.

FIG. 15 shows front oblique view of a present invention installed device 300, with reflector detector device 301 with placement stand 303. The placement stand 303 may be any permanent or temporary stand, such as are used for permanent mile markers, signs and mailboxes, or temporary road signs (sometimes with a single pole but a criss-cross or extended legs base). Present invention reflector detector device 301 has 360 degree surround rectangular lenses, such as lenses 305, 307 and 309 and, above its top 311 is a weather shield 313. (these lenses may be combinations of any described above, and in semi-autonomous uses, the cautionary colors of red and orange are particularly beneficial. As can be seen, the rectangular shaped lenses take up almost all of the space, except for thin supports, and thus maximize use of incoming and return of outgoing light signals. The wireless communications system 315 is attached to device 300 and may be any of those previously described. It has an upwardly extended combination antenna and warning light 317.

FIG. 16 shows a front view of a stacked arrangement 320 of present invention reflector detector devices 321, 327 and 333. These have diverse shielding sections, particularly useful for four-way, partially or fully obscured, intersections. Device 321 has East and West shields, such as shield 323, with an array of lenses shown generally as lens area

325. Device 327 has North and South shields, such as shield 331, with an array of lenses, such as is shown generally as lens area 329. Device 333 has no shields and a full lens area 335, with weather shield 337 atop it. As shown, various optional symbols may be included in one or more lenses, such as "SCHOOL ZONE" shown in this Figure. The wireless communications system 339 is attached to device stacked arrangement 320 and may be any of those previously described.

Although particular embodiments of the invention have been described in detail herein with reference to the accompanying drawings, it is to be understood that the invention is not limited to those particular embodiments, and that various changes and modifications may be made therein by one skilled in the art without departing from the scope or spirit of the invention, as defined in the appended claims. For example, the actual shape of the main housing may be any of numerous possibilities as long as its functionality as described is not affected adversely. Also, as another example, the lenses may have device identifying symbols, such as binary number stenciling or template features, or barcodes, QR codes, reference numbers and/or letters, or any other device identifying symbols in addition to or in place of symbols communicating information other than device identification.

What is claimed is:

1. An autonomous vehicle dual traffic reflector device for detecting a second autonomous vehicle by a first autonomous vehicle, which comprises:
    a) an outer array, the outer array having a plurality of light receiving-light transmitting lens, the outer array positioned in an arcuate arrangement having at least one focal point and the outer array having at least two lenses selected from a group consisting of caution-colored lenses, colored lenses, clear lenses and combinations thereof;
    b) an inner array of reflective mirrors positioned inside the outer array and between the outer array and a focal point of the at least one focal point of side outer array, the inner array positioned to receive light passing into the device through at least one lens and reflecting the light out of the device through at least one different lens, the different lens being at least one of the at least two lenses; and
    c) a wireless communication component with a power source, the component being located at and connected to the device, and selected from a group consisting of:
    (i) a receiver for receiving information from a central control base via satellite;
    (ii) a transmitter for transmitting information to the central control base via satellite;
    (iii) a receiver for receiving information from the second autonomous vehicle via wireless transmission;
    (iv) a transmitter for transmitting information to the first autonomous vehicle via wireless transmission; and
    (v) any combination thereof;
    further, whereas when the first autonomous vehicle and the second autonomous vehicle are traveling toward one another in opposite directions and a light beam from the first autonomous vehicle enters the autonomous vehicle dual traffic reflector device and reflects therein to be transmitted in a recognized light to the second autonomous vehicle, a second autonomous vehicle sensor relays angle and distance information to its computer to make necessary lane adjustments to avoid vehicle collision, and when a wireless communication is sent or received from the first autonomous vehicle, that wireless communication is recognized, interpreted and acted upon by the second autonomous vehicle.

2. The reflector device of claim 1 wherein the wireless communication component with the power source further includes at least one light connected thereto for activation to signal a message through the outer array.

3. The reflector device of claim 1 wherein the arcuate arrangement is selected from a group consisting of sinusoidal, arc of fixed radius, arc of varying radius, circle and polygon.

4. The reflector device of claim 1 wherein there are at least four lenses, each being in a different plane from the others.

5. The reflector device of claim 1 wherein there are at three to twelve reflectors in the inner array, each in a different plane from the others.

6. The reflector device of claim 1 wherein the wireless communication component includes all of:
    (i) the receiver for receiving information from the central control base via satellite;
    (ii) the transmitter for transmitting information to the central control base via satellite;
    (iii) the receiver for receiving information from the second autonomous vehicle via wireless transmission;
    (iv) the transmitter for transmitting information to the first autonomous vehicle via wireless transmission, and the wireless communication component receives messages from either of the autonomous vehicles and sends it to the central control base and vice versa.

7. The reflector device of claim 1 wherein the reflectors are selected from a group consisting of flat reflectors, curved reflectors and combinations thereof.

8. The reflector device of claim 1 wherein the power source is selected from a group consisting of solar panels, wind generators, batteries, grid power, and combinations thereof.

9. The reflector device of claim 1 wherein the arcuate arrangement of the outer array is circular and the at least two lenses are colored selected from a color group consisting of red, orange, yellow and combinations thereof.

10. An autonomous vehicle dual traffic reflector detector guidance system, which comprises:
    a) a plurality of autonomous vehicles including a first autonomous vehicle and a second autonomous vehicle, each of the plurality of autonomous vehicles having a forward projecting light that includes vectors of light beams directed away from a lane of travel and light receiving sensors that recognize caution-colored light, including angle and distance, and including computer adjustment to lane positioning;
    b) a plurality of roadways having at least two lanes of travel, including a first lane for travel in a first direction and a second lane for travel in a second direction, the second direction being opposite the first direction, the roadways further including side areas outside of the first lane and the second lane;
    c) a plurality of autonomous vehicle dual traffic reflector devices for detecting the second autonomous vehicle by the first autonomous vehicle located along the side areas of the plurality of roadways wherein each of the devices include:
    i) an outer array, the outer array having a plurality of light receiving-light transmitting lens, the outer array positioned in an arcuate arrangement having at least one focal point and the outer array having at least two lenses selected from a group consisting of caution-colored lenses, colored lenses, clear lenses and combinations thereof;

ii) an inner array of reflective mirrors positioned inside the outer array and between the outer array and a focal point of the at least one focal point of side outer array, the inner array positioned to receive light passing into the device through at least one lens and reflecting the light out of the device through at least one different lens, the different lens being at least one of the at least two lenses; and iii) a wireless communication component with a power source, the component being located at and connected to each of the devices, and selected from a group consisting of:

(i) a receiver for receiving information from a central control base via satellite;

(ii) a transmitter for transmitting information to the central control base via satellite;

(iii) a receiver for receiving information from the second autonomous vehicle via wireless transmission;

(iv) a transmitter for transmitting information to the first autonomous vehicle via wireless transmission; and (v) any combination thereof;

further, whereas when the first autonomous vehicle and the second autonomous vehicle are traveling toward one another in opposite directions and a light beam from the first autonomous vehicle enters the autonomous vehicle dual traffic reflector device and reflects therein to be transmitted in a recognized light to the second autonomous vehicle, a second autonomous vehicle sensor relays angle and distance information to its computer to make necessary lane adjustments to avoid vehicle collision, and when a wireless communication is sent or received from the first autonomous vehicle, that communication is recognized, interpreted and acted upon by the second autonomous vehicle.

11. The system of claim 10 wherein the plurality of autonomous vehicle include a computer that, at least in part, travels in conjunction with a satellite GPS guidance system in coordination with the autonomous vehicle dual traffic reflector detector system.

12. The system of claim 10 wherein the wireless communication component with the power source further includes at least one light connected thereto for activation to signal a message through the outer array.

13. The system of claim 10 wherein the arcuate arrangement is selected from a group consisting of sinusoidal, arc of fixed radius, arc of varying radius, circle and polygon.

14. The system of claim 10 wherein there are at least four lenses, each being in a different plane from each other.

15. The system of claim 10 wherein there are at least three to twelve reflectors in the inner array, each in a different plane from each other.

16. The system of claim 10 wherein the wireless communication component includes all of:

(i) the receiver for receiving information from the central control base via satellite;

(ii) the transmitter for transmitting information to the central control base via satellite;

(iii) the receiver for receiving information from the second autonomous vehicle via wireless transmission;

(iv) the transmitter for transmitting information to the first autonomous vehicle via wireless transmission, and the wireless communication component receives messages from either of the autonomous vehicles and sends it to the central control base and vice versa.

17. The system of claim 10 wherein the reflectors are selected from a group consisting of flat reflectors, curved reflectors and combinations thereof.

18. The system of claim 10 wherein the power source is selected from a group consisting of solar panels, wind generators, batteries, grid power, and combinations thereof.

19. The system of claim 10 wherein the power source is a wired power source to a grid and includes a transformer.

20. The system of claim 10 wherein the arcuate arrangement of the outer array is circular and the at least two lenses are colored selected from a color group consisting of red, orange, yellow and combinations thereof.

* * * * *